No. 860,815. PATENTED JULY 23, 1907.
A. LOOCK.
HOOF CUTTER.
APPLICATION FILED MAY 28, 1907.
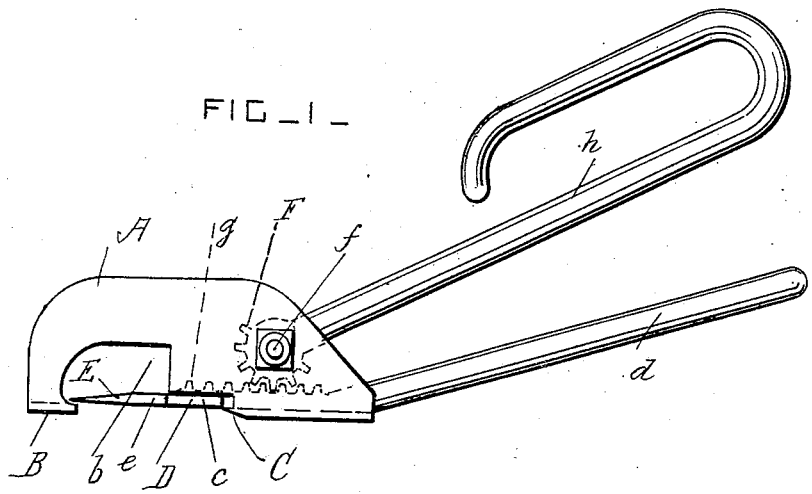
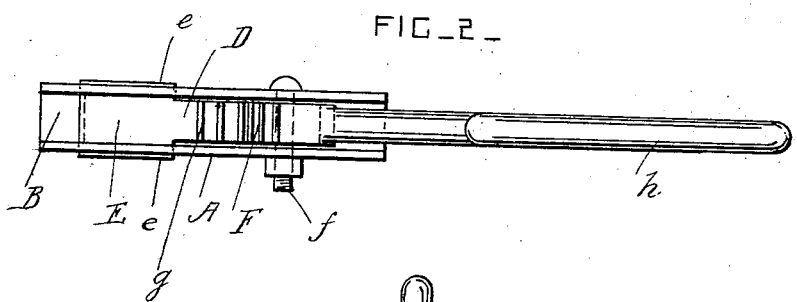
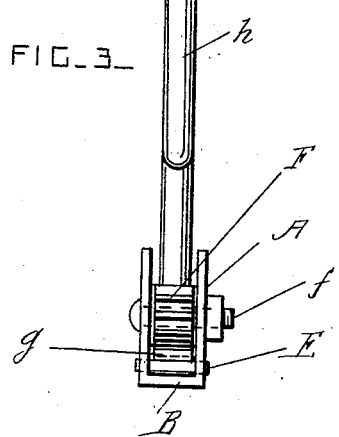
WITNESSES:
C. E. Brown.
Walter Allen
INVENTOR
August Loock.
BY
Hubert W. Jenner.
Attorney

UNITED STATES PATENT OFFICE.

AUGUST LOOCK, OF HAYFIELD, IOWA.

HOOF-CUTTER.

No. 860,815.  Specification of Letters Patent.  Patented July 23, 1907.

Application filed May 28, 1907. Serial No. 376,111.

*To all whom it may concern:*

Be it known that I, AUGUST LOOCK, a citizen of the United States, residing at Hayfield, in the county of Hancock and State of Iowa, have invented certain new and useful Improvements in Hoof-Cutters; and I do hereby declare the following to be a full, clear, and exact description of the invention, such as will enable others skilled in the art to which it appertains to make and use the same.

This invention relates to devices for cutting the hoofs of animals; and it consists in the novel construction and combination of the parts hereinafter fully described and claimed.

In the drawings, Figure 1 is a side view of the hoof cutter. Fig. 2 is a top plan view of the same. Fig. 3 is an end view of the hoof cutter.

A is a channel-shaped guide provided with a gap $b$, and guide notches $c$ on its lower side to the rear of the said gap.

B is a stationary blade on the front end portion of the guide at the front end of the gap, and C is a beveled portion on the underside of the guide close behind the said guide notches.

D is a bar which is slidable in the channel-shaped guide, and E is a cutting blade formed on the front end of the said bar. The cutting-blade is wider than the bar D so that its edges $e$ slide in the guide notches $c$, and the sharp edge of the said blade is arranged to work in connection with the blade B like the blades of a pair of shears. The bar D is provided with a rearwardly projecting handle $d$ for operating it.

F is a toothed segment which is pivoted on a pin $f$ in the said channel-shaped guide, and which gears into teeth $g$ formed on the said bar D. The toothed segment is also provided with a rearwardly bent and projecting handle $h$, which is preferably recurved as shown in the drawings.

The two handles are moved back and forth by hand so as to reciprocate the toothed rack-bar and the slidable blade, and the hoof of the animal is cut between the two said blades B and E.

What I claim is:

1. In a hoof cutter, the combination, with a guide provided with a blade at one end and having guide notches at its middle part, of a bar slidable in the said guide and provided with a blade having projecting side portions which are slidable in the said guide notches, and means for sliding the said bar in the said guide.

2. In a hoof cutter, the combination, with a channel-shaped guide provided with a gap and guide notches at one end of the gap, said guide having also a stationary blade on the other end of the said gap, of a toothed rack-bar provided with a handle and slidable in the said guide, said rack-bar having a cutting-blade at its front provided with projecting side portions which slide in the said guide notches, and a toothed segment pivoted in the said guide in gear with the said rack-bar and also provided with a handle.

In testimony whereof I have affixed my signature in the presence of two witnesses.

AUGUST LOOCK.

Witnesses:
F. R. LACKORE,
L. J. ALCORN.